United States Patent
Kang et al.

(10) Patent No.: US 8,766,315 B2
(45) Date of Patent: Jul. 1, 2014

(54) QUANTUM DOT-BLOCK COPOLYMER HYBRID, METHODS OF FABRICATING AND DISPERSING THE SAME, LIGHT EMITTING DEVICE INCLUDING THE SAME, AND FABRICATION METHOD THEREOF

(75) Inventors: Jong Hyuk Kang, Suwon-si (KR); Junghan Shin, Yongin-si (KR); Jae Byung Park, Seoul (KR); Dong-Hoon Lee, Yangsan-si (KR); Kookheon Char, Seoul (KR); Seonghoon Lee, Seoul (KR); WanKi Bae, Seoul (KR); Jaehoon Lim, Seoul (KR)

(73) Assignee: Samsung Display Co., Ltd. (KR)

( * ) Notice: Subject to any disclaimer, the term of this patent is extended or adjusted under 35 U.S.C. 154(b) by 296 days.

(21) Appl. No.: 12/886,853

(22) Filed: Sep. 21, 2010

(65) Prior Publication Data

US 2011/0227034 A1  Sep. 22, 2011

(30) Foreign Application Priority Data

Mar. 22, 2010  (KR) .................. 10-2010-0025437

(51) Int. Cl.
  *H01L 33/00* (2010.01)
(52) U.S. Cl.
  USPC ............ 257/103; 257/E33.002; 977/774
(58) Field of Classification Search
  USPC .................. 257/103, E33.002; 977/774
  See application file for complete search history.

(56) References Cited

U.S. PATENT DOCUMENTS

| | | | | |
|---|---|---|---|---|
| 6,054,507 | A * | 4/2000 | Funaki et al. ............... 523/210 |
| 6,582,921 | B2 * | 6/2003 | Mirkin et al. ............... 435/6.12 |
| 6,767,702 | B2 * | 7/2004 | Mirkin et al. ............... 435/6.11 |
| 6,869,864 | B2 * | 3/2005 | Yim et al. .................. 438/497 |
| 7,132,787 | B2 * | 11/2006 | Ozkan et al. ................ 313/503 |
| 7,595,108 | B2 * | 9/2009 | Perez et al. ................. 428/403 |
| 2003/0066998 | A1 * | 4/2003 | Lee .............................. 257/19 |
| 2003/0096113 | A1 * | 5/2003 | Jacobson et al. ............ 428/379 |
| 2006/0088713 | A1 | 4/2006 | Dykstra et al. |
| 2007/0286883 | A1 * | 12/2007 | Lensen et al. .............. 424/423 |
| 2008/0033106 | A1 * | 2/2008 | Koroskenyi et al. ........ 524/801 |
| 2008/0039816 | A1 * | 2/2008 | Svarovsky et al. .......... 604/503 |
| 2008/0226895 | A1 * | 9/2008 | Perez et al. ................. 428/323 |
| 2008/0264488 | A1 * | 10/2008 | Balasubramanian et al. 136/263 |

(Continued)

FOREIGN PATENT DOCUMENTS

| | | |
|---|---|---|
| EP | 2028248 A1 | 2/2009 |
| KR | 1020080100726 | 11/2008 |

(Continued)

OTHER PUBLICATIONS

Hezinger, et al., Polymer coating of quantum dots—A powerful tool toward diagnostics and sensorics, ScienceDirect, European Journal of Pharmaceutics and Biopharmaceutics 68 (2008) pp. 138-152.

(Continued)

*Primary Examiner* — Jarrett Stark
(74) *Attorney, Agent, or Firm* — Cantor Colburn LLP

(57) ABSTRACT

Disclosed are a quantum dot-block copolymer hybrid, methods of fabricating and dispersing the same, a light emitting device including the same, and a fabrication method thereof. The quantum dot-block copolymer hybrid includes; a quantum dot, and a block copolymer surrounding the quantum dot, wherein the block copolymer has a functional group comprising sulfur (S) and forms a chemical bond with the quantum dot.

6 Claims, 12 Drawing Sheets

(56) References Cited

U.S. PATENT DOCUMENTS

2009/0045422 A1* 2/2009 Kato et al. .............. 257/98
2010/0123155 A1 5/2010 Pickett et al.
2011/0068321 A1* 3/2011 Pickett et al. .............. 257/13

FOREIGN PATENT DOCUMENTS

| KR | 1020090033947 | 4/2009 |
|----|---------------|--------|
| WO | 02058928 A1 | 8/2002 |
| WO | 2005034205 A3 | 4/2005 |
| WO | 2006001848 A3 | 1/2006 |
| WO | 2007078038 A1 | 7/2007 |
| WO | 2009097319 A3 | 8/2009 |
| WO | 2009139939 A3 | 11/2009 |

OTHER PUBLICATIONS

Li, et al., Smart core/shell nanocomposites: Intelligent polymers modified gold nanoparticles, Advances in Colloid and Interface Science, 149 (2009) pp. 28-38.

Tomczak, et al.., Designer polymer—quantum dot architectures, Progress in Polymer Science, 34 (2009) pp. 393-430.

Mattoussi, et al., Composite thin films of CdSe nanocrystals and a surface passivating/electron transporting block copolymer: Correlations between film microstructure by transmission electron microscopy and electroluminescence, Journal of Applied Physics, vol. 86, No. 8, Oct. 15, 1999, pp. 4390-4399.

Extended European Search Report for Application No. 10013605.0-1218/2371926 dated Nov. 6, 2012.

* cited by examiner

QUANTUM DOT-BLOCK COPOLYMER HYBRID, METHODS OF FABRICATING AND DISPERSING THE SAME, LIGHT EMITTING DEVICE INCLUDING THE SAME, AND FABRICATION METHOD THEREOF

This application claims priority to Korean Patent Application No. 2010-25437, filed on Mar. 22, 2010, and all the benefits accruing therefrom under 35 U.S.C. §119, the content of which in its entirety is herein incorporated by reference.

BACKGROUND OF THE INVENTION

1. Field of the Invention

The present invention relates to a quantum dot-block copolymer hybrid, methods of fabricating and dispersing the same, a light emitting device including the same, and a fabrication method thereof.

2. Description of the Related Art

A quantum dot is a material having a crystalline structure only a few nanometers in size, and typically includes about a few hundred atoms to about a few thousand atoms.

Since the quantum dot is very small, a quantum confinement effect occurs therein. According to the quantum confinement effect, an energy band gap of a material is increased when the material is reduced to a nano size or less. Therefore, when a wavelength of light incident into the quantum dot has an energy higher than the energy band gap, the quantum dot absorbs the light so that an energy level of the quantum dot is excited into an excited state. Then, the quantum dot emits light having a specific wavelength so that the energy level of the quantum dot is dropped to a ground state. At this time, the light emitted from the quantum dot may have a wavelength corresponding to the band gap energy.

The light emitting characteristics of the quantum dot can be adjusted by controlling the size and composition of the quantum dot, and therefore the quantum dot has been extensively employed in various light emitting devices.

BRIEF SUMMARY OF THE INVENTION

The present invention provides a quantum dot-block copolymer hybrid that can be easily dispersed with a high binding stability.

The present invention also provides a light emitting device including the quantum dot-block copolymer hybrid.

The present invention also provides a method of fabricating the quantum dot-block copolymer hybrid.

The present invention also provides a method of dispersing the quantum dot-block copolymer hybrid.

The present invention also provides a method of fabricating a light emitting device including the quantum dot-block copolymer hybrid.

In one aspect, an exemplary embodiment of a quantum dot-block copolymer hybrid includes a quantum dot, and a block copolymer surrounding the quantum dot, wherein the block copolymer has a functional group comprising sulfur (S) which forms a chemical bond with the quantum dot.

In one exemplary embodiment, the chemical bond may be a coordinate covalent bond and a central atom may be the quantum dot.

In one exemplary embodiment, the quantum dot has one of a single core structure, a core-single shell structure, and a core-multi-shell structure.

In one exemplary embodiment, the quantum dot includes group II-VI elements, group III-V elements, group IV elements, or group IV-VI elements. The group II element includes at least one selected from the group consisting of zinc (Zn), cadmium (Cd), and mercury (Hg), the group III element includes at least one selected from the group consisting of aluminum (Al), gallium (Ga), and indium (In), the group IV element includes at least one selected from the group consisting of silicon (Si), germanium (Ge), tin (Sn), and lead (Pb), the group V element includes at least one selected from the group consisting of nitrogen (N), phosphorus (P), and arsenic (As), and the group VI element includes at least one selected from the group consisting of sulfur (S), selenium (Se), and tellurium (Te).

In one exemplary embodiment, the function group may include one of alkylthiol, alkyl xanthate, dialkylthio carbamate, dialkyldisulfide, and dialkylsulfide. In such an exemplary embodiment, the alkyl group has a carbon number in the range about 1 to about 22 carbon atoms.

In another aspect, a light emitting device includes the quantum dot-block copolymer hybrid. The light emitting device includes a substrate and a quantum dot-block copolymer hybrid layer disposed on the substrate and including the quantum dot-block copolymer hybrid.

In one exemplary embodiment, the light emitting device may include a light emitting diode interposed between the substrate and at least part of the hybrid layer to provide light to the hybrid layer. The light emitting diode may emit light capable of exciting a luminous body in the hybrid layer. In such an exemplary embodiment, the hybrid layer absorbs the light and emits light corresponding to an energy band gap between an excited state and a ground state of the quantum dot.

An exemplary embodiment of a method of fabricating a quantum dot-block copolymer hybrid includes providing a quantum dot, providing a block copolymer having a functional group comprising sulfur (S), mixing the quantum dot with the block copolymer, and chemically bonding the quantum dot with the functional group, e.g., in one exemplary embodiment the chemical bonding is achieved by applying energy to the mixture.

In one exemplary embodiment, the quantum dot-block copolymer hybrid fabricated through the method is dissolved in a solvent capable of melting the hybrid and matrix polymer together, and the solution is stirred, so that quantum dots may be dispersed in the matrix polymer.

In one exemplary embodiment, the matrix resin may include at least one of silicone resin, epoxy resin, acrylic resin, vinyl resin, and a hybrid resin thereof. For example, in one exemplary embodiment the matrix resin may include polystyrene.

In one exemplary embodiment, the quantum dots dispersed through the method may be disposed on the substrate through at least one of a spin coating scheme, a drop casting scheme, and a doctor blade scheme.

As described above, according to the present invention, a chemical bond is formed between the quantum dot and block copolymer surrounding the quantum dot, thereby increasing colloid stability of the quantum dot-block copolymer hybrid. Accordingly, the quantum dot-block copolymer hybrid can be easily dispersed. In addition, the quantum dot-block copolymer hybrid can reduce formation of aggregations, so that a pattern can be easily formed. Since the dispersed hybrid can be easily formed on the substrate, the light emitting device can be easily fabricated.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
FIG. 1 is a cross-sectional view showing an exemplary embodiment of a light emitting device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Exemplary embodiments of quantum dot-block copolymer hybrids according to the present invention include quantum dots and block copolymers surrounding the quantum dots.

A quantum dot is one type of nano-material. The quantum dot exhibits a quantum confinement effect. The most remarkable feature of the quantum confinement effect is that a band gap is increased. Accordingly, different from crystals in bulk form, the quantum dot displays discrete energy band gaps similar to those display by one individual atom. In the quantum dot, the interval of the discrete band gaps may be adjusted according to the size of the quantum dot.

The quantum dot may have various compositions, and may, for example, include group II-VI elements, group III-V elements, group IV elements or group IV-VI elements.

In one exemplary embodiment, the group II element may include one selected from the group consisting of zinc (Zn), cadmium (Cd), and mercury (Hg). In one exemplary embodiment, the group III element may include one selected from the group consisting of aluminum (Al), gallium (Ga), and indium (In). In one exemplary embodiment, the group IV may include one selected from the group consisting of silicon (Si), germanium (Ge), tin (Sn), and lead (Pb). In one exemplary embodiment, the group V element may include one selected from the group consisting of nitrogen (N), phosphorus (P), and arsenic (As). In one exemplary embodiment, the group VI element may include one selected from the group consisting of sulfur (S), selenium (Se), and tellurium (Te).

The quantum dot is not limited to a specific structure, and may have one of a single-type structure including only a core, a core-single shell structure having a core and a single layer shell, and a core-multi-shell structure having a core and a multiple-layer shell and various other configurations.

The block copolymer is a ligand surrounding the quantum dot, and forms a chemical bond with the quantum dot. Especially, in one exemplary embodiment the chemical bond may be a coordinate covalent bond.

The block copolymer has a multi-block structure having two blocks or more. In one exemplary embodiment, the block copolymer includes a functional group forming a coordinate covalent bond with the quantum dot. The functional group may belong to a main chain of the block copolymer or a side chain attached to the main chain of the block copolymer. In addition, functional groups may be randomly distributed to the main chain and the side chain.

The present invention may employ various functional groups to form a chemical bond, such as a coordinate covalent bond, with the quantum dot. For example, in one exemplary embodiment the present invention may employ a functional group including sulfur (S). The functional group may include one of alkylthiol, alkyl xanthate, and dialkylthiocarbamate having a carbon number in the range of 1 to 22 carbon atoms.

The functional group is chemically bonded with a center element constituting the quantum dot. The chemical bond is stronger than a physical bond using van der Waals force or dipole force. The chemical bond may include an ionic bond, a covalent bond, or a coordinate covalent bond or any other type of chemical bond. In addition, the chemical bond may have bonding strength similar to that of an ionic bond, a covalent bond, or a coordinate covalent bond.

In one exemplary embodiment, the quantum dot-block copolymer hybrid may be dispersed in a matrix polymer. The matrix polymer refers to a gel-type material or a solid-phase material with sufficient physical characteristics to fix the hybrid thereto. The present invention may employ various matrix polymers having transparency, thermal stability, moisture resistance, and low gas permeability characteristics. The matrix polymer may include silicone resin, epoxy resin, acrylic resin, vinyl resin, or a hybrid thereof.

In one exemplary embodiment, the quantum dot-block copolymer hybrid may be used in a light emitting device.

FIG. 1 is a cross-sectional view showing one exemplary embodiment of a light emitting device according to the present invention.

Referring to FIG. 1, the current exemplary embodiment of a light emitting device according to the present invention includes a substrate 110 and a quantum dot-block copolymer hybrid layer 120 formed on the substrate 110.

The present invention may employ various substrates on which the quantum dot-block copolymer hybrid layer 120 may be provided. For example, the substrate 110 may be a polymer resin substrate, a silicon substrate, a glass substrate or substrates made from other materials with similar characteristics.

The quantum dot-block copolymer hybrid layer 120 includes a matrix polymer and the quantum dot-block copolymer hybrid. The quantum dot-block copolymer hybrid may be dispersed into the matrix polymer, e.g., the quantum dot-block copolymer hybrid may be heterogeneously or homogeneously distributed throughout the matrix polymer.

Since the quantum dot of the quantum dot-block copolymer hybrid layer 120 has a predetermined band gap resulting from the quantum confinement effect, the light emitting device according to the present embodiment may emit light having a specific wavelength, e.g., the emitted light may have a maximum output at a predetermined wavelength. For example, when a predetermined range of energy is applied to the quantum dot, the quantum dot is raised into an excited state. Thereafter, while returning from the excited state to a ground state, the quantum dot emits light having a specific wavelength corresponding to the energy difference between the excited and ground states.

Figure 2:
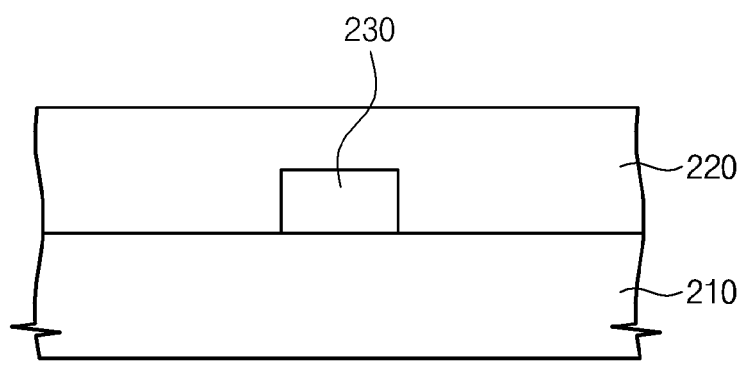
FIG. 2 is a cross-sectional view showing another exemplary embodiment of a light emitting device according to the present invention.

FIG. 2 is a cross-sectional view showing another embodiment of a light emitting device according to the present invention.

Referring to FIG. 2, the current exemplary embodiment of a light emitting device according to the present invention includes a substrate 210, a light emitting diode 230 formed on the substrate 210, and a quantum dot-block copolymer hybrid layer 220 formed on the light emitting diode 230.

Although the substrate 210 is not limited to a specific type, the substrate 210 may include an insulating polymer such as plastic, glass, ceramic or other material with similar characteristics. For example, in one exemplary embodiment the substrate 210 may include poly phthalamide ("PPA").

The light emitting diode 230 is mounted on the substrate 210 to provide light with a wavelength (i.e., an energy) capable of photo-exciting the quantum dot.

The quantum dot-block copolymer hybrid layer 220 is formed on the light emitting diode 230. The quantum dot-block copolymer hybrid layer 220 includes the quantum dot-block copolymer hybrid, and the quantum dot-block copolymer hybrid is dispersed into a matrix resin, similar to that described above with respect to FIG. 1. The matrix resin includes insulating polymer. For example, in one exemplary embodiment, the matrix resin may include silicone resin, epoxy resin, acrylic resin, a hybrid thereof or other materials with similar characteristics.

The quantum dot contained in the quantum dot-block copolymer hybrid layer 220 absorbs light emitted from the light emitting diode 230, so that the quantum dot is raised into an excited state. Then, the quantum dot is dropped into a ground state from the excited state to emit light having a wavelength corresponding to the energy difference between the excited and ground states. In one exemplary embodiment the energy of the light emitted from the quantum dot is different from that of the light of the light emitting diode 230. Based on this principle, wavelengths of a visible ray band representing various colors can be adjusted according to the band gap of the quantum dot. In particular, the emission wavelength of the light emitting diode 230 may be variously selected in a wavelength band in which the quantum dot can absorb light through photo excitation of the quantum dot. After the quantum dot has absorbed the light, the quantum dot can emit light having a wavelength greater than that of the light which has been absorbed. In this case, since lights having various colors can be emitted from one device, the device may not only emit various individually colored lights existing in a visible ray band but the device may also emit a white color light which can be realized through the combination of at least two colors.

The quantum dot-block copolymer hybrid layer 220 having the same structure is fabricated through the following method.

First, a quantum dot is formed. The quantum dot may be formed with various schemes, but the present invention is not limited thereto.

Exemplary embodiments of the quantum dot may include group II-VI elements, group III-V elements, group IV elements, or group IV-VI elements, but the present invention is not limited thereto.

Exemplary embodiments of the group II element may include one selected from the group consisting of Zn, Cd, and Hg. Exemplary embodiments of the group III element may include one selected from the group consisting of Al, Ga, and In. Exemplary embodiments of the group IV element may include one selected from the group consisting of Si, Ge, Sn, and Pb. Exemplary embodiments of the group V element may include one selected from the group consisting of N, P, and As. Exemplary embodiments of the group VI element may include one selected from the group consisting of S, Se, and Te.

The quantum dot is not limited to a specific structure, and may have one of a single-type structure including only a core, a core-single shell structure having a core and a single layer shell, and a core-multi-shell structure having a core and a multiple-layer shell and various other similar structures.

Next, a block copolymer with a functional group including S is formed. The block copolymer may be polymerized through various schemes including a chain-growth polymerization scheme and a step growth polymerization, but the present invention is not limited thereto. The chain-growth polymerization scheme includes a reversible addition-fragmentation chain transfer ("RAFT") scheme, a nitroxide-mediated polymerization ("NMP") scheme, an atomic transfer radical polymerization ("ATRP") scheme, a cationic polymerization scheme, an anionic polymerization scheme, and a radical polymerization scheme. In one exemplary embodiment, the step growth polymerization scheme includes a dehydration condensation scheme.

Thereafter, the quantum dot is mixed with the block copolymer.

Next, energy is supplied to the mixture such that the quantum dot is bonded with the functional group through a chemical bond, thereby forming the quantum dot-block copolymer hybrid. The energy is supplied for the purpose of bond reaction between the quantum dot and the functional group. For example, the energy is supplied by applying heat to the mixture, stirring the mixture while applying heat to the mixture, applying an ultrasonic wave to the mixture or a combination of the above.

The quantum dot-block copolymer is formed through a grafting to method or a grafting from method as will be explained in more detail. In the grafting-to method, the quantum dot is bonded with the block copolymer after the block copolymer has been synthesized. In the grafting-from method, single molecules and a polymer having a functional group enabling a chemical bond are bonded with the quantum dot, and a polymerization initiator and a monomer are added to the result together such that the block copolymer is additionally grown from the quantum dot or the hybrid.

The present invention may employ various functional groups to form a chemical bond, such as a coordinate covalent bond, with the quantum dot. For example, as has been described above, the present invention may employ a functional group including S. The functional group including S may be one of alkylthiol, alkyl xanthate, and dialkylthiocarbamate, in which a carbon number of the alkyl group is in the range of 1 to 22 carbon atoms.

After the quantum dot-block copolymer hybrid has been completely synthesized, a non-solvent that cannot dissolve the hybrid is added to a solution in which the synthesis is completed, so that the quantum dot-block copolymer hybrid is precipitated in the solution. Then, the precipitate is separated from the solution using a centrifugal machine, and a solvent is added to disperse the hybrid. Accordingly, the precipitation, the separation, and the dispersion are repeated several times to obtain the quantum dot-block copolymer hybrid having a desired degree of purify.

The quantum dot-block copolymer hybrid is dispersed in a matrix polymer, so that the quantum dot-block copolymer hybrid may be applied to a light emitting device. Although the present invention has been described such that the light emitting device employs the quantum dot-block copolymer hybrid, the present invention is not limited thereto.

In order to disperse the hybrid in the matrix polymer, after the hybrid and the matrix polymer have been formed, the hybrid and the matrix polymer are dissolved in a solvent.

In order to adjust the dispersal and the degree of aggregation of the hybrid when the hybrid is dispersed in the matrix polymer, a grafting density of the block copolymer in the hybrid may be adjusted. In addition, the dispersal and the degree of aggregation of the hybrid can be adjusted by adjusting the molecular weight of the matrix polymer with respect to the molecular weight of the block copolymer in the hybrid. Moreover, the dispersal and the degree of aggregation of the hybrid can be adjusted by adjusting the molecular weight of the block copolymer in the hybrid. The grafting density refers to the number-average molecular weight of the matrix polymer bonded with the quantum dot.

The matrix polymer may include silicone resin, epoxy resin, acrylic resin, vinyl resin, a hybrid of the above resin or other materials with similar characteristics. According to one exemplary embodiment, the matrix polymer may include polystyrene. In the exemplary embodiment wherein the matrix polymer is polystyrene, the solvent may be toluene.

The hybrid dispersed in the matrix polymer is formed on a substrate to provide the light emitting device as illustrated in FIG. 2.

The light emitting device may be fabricated by preparing a substrate and forming the thin film including the dispersed hybrid on the substrate.

Since the dispersed hybrid has a liquid phase, the hybrid may be provided in the form of a thin film on the substrate through a spin coating scheme, a drop casting scheme, a doctor blade scheme or various other techniques as would be known to one of ordinary skill in the art. However, the method of forming the dispersed hybrid thin film is not limited thereto.

Embodiment 1

Formation of Block Copolymer

Poly(styrene-b-cysteamine acrylamide, which is block copolymer, was synthesized through an RAFT scheme. First, 0.06 mg of 2-phenylpropan-2-yl benzodithioate and 0.006 mg of α, α'-azoisobutyronitrile ("AIBN"), which act as a chain transfer agent, and 9.2 mmol of styrene monomer were melted in 4 mmol of dioxane.

Next, the solution reacted in a nitrogen atmosphere and a temperature of about 90° C. for about 24 hours to polymerize polymer A having a polystyrene hydrocarbon chain. The above polymerization reaction is expressed as following chemical formula 1.

<Chemical Formula 1>

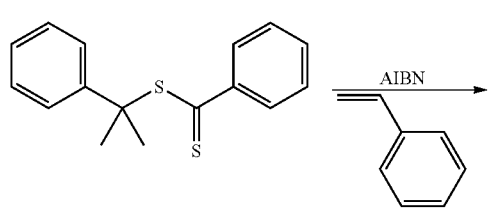

<Polymer A>

The polymer A was cleaned and purified using methanol after the polymerization reaction.

After the polymer A was synthesized, 0.12 mmol of pentafluoroacrylate substitutable to another functional group and the polymer A were melted in 3 mL of dioxane, and the resulting solution was subject to chemical reaction at a nitrogen atmosphere and a temperature of 90° C. for three days, thereby synthesizing poly(styrene-b-pentafluoroacrylate). The chemical reaction is expressed as chemical formula 2.

<Chemical Formula 2>

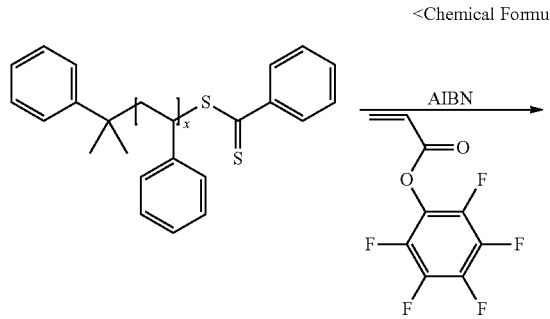

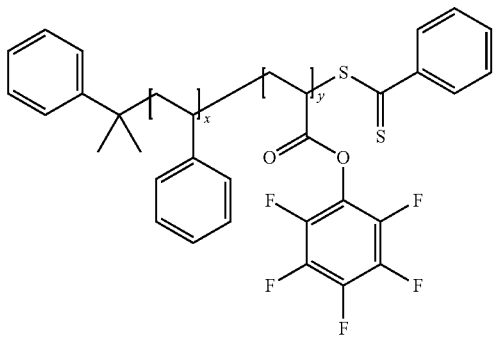

The poly(styrene-b-pentafluoroacrylate) was cleaned and purified using methanol.

Next, the poly(styrene-b-pentafluoroacrylate) was melted in tetrahydrofuran, and cysteamine acrylamide dissolved in the tetrahydrofuran was slowly added into a reactor. Thereafter, the solution is stirred for about 24 hours to obtain poly(styrene-b-cysteamine acrylamide). The chemical reaction is expressed as following chemical formula 3.

<Chemical Formula 3>

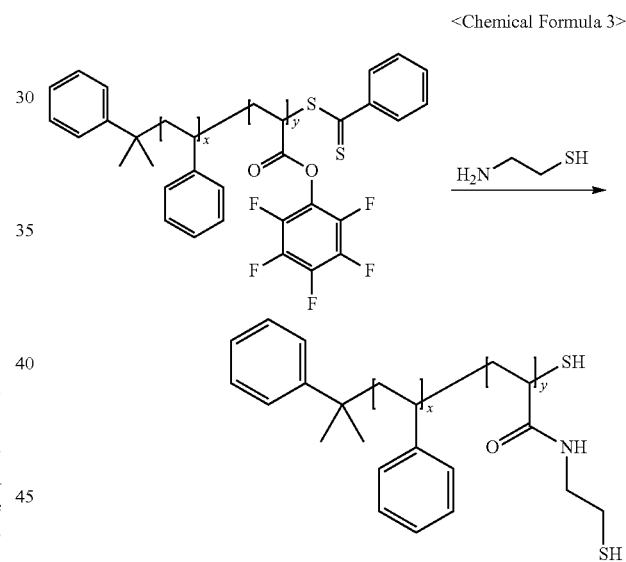

The poly(styrene-b-cysteamine acrylamide) was filtered and purified.

Embodiment 2

Fabrication of Quantum Dot-Block Copolymer Hybrid

In this embodiment, 3 mg of the poly(styrene-b-cysteamine acrylamide) was melted in toluene. The result was mixed with 10 mg of the quantum dots, and received an ultrasonic wave for about two hours, thereby forming the quantum dot-bloc copolymer hybrid. The residue after the reaction was completed was subject to precipitation and dispersion several times using methanol and toluene so that the residue was purified.

Embodiment 3

Stability of Quantum Dot-Block Copolymer Hybrid

Figure 3:
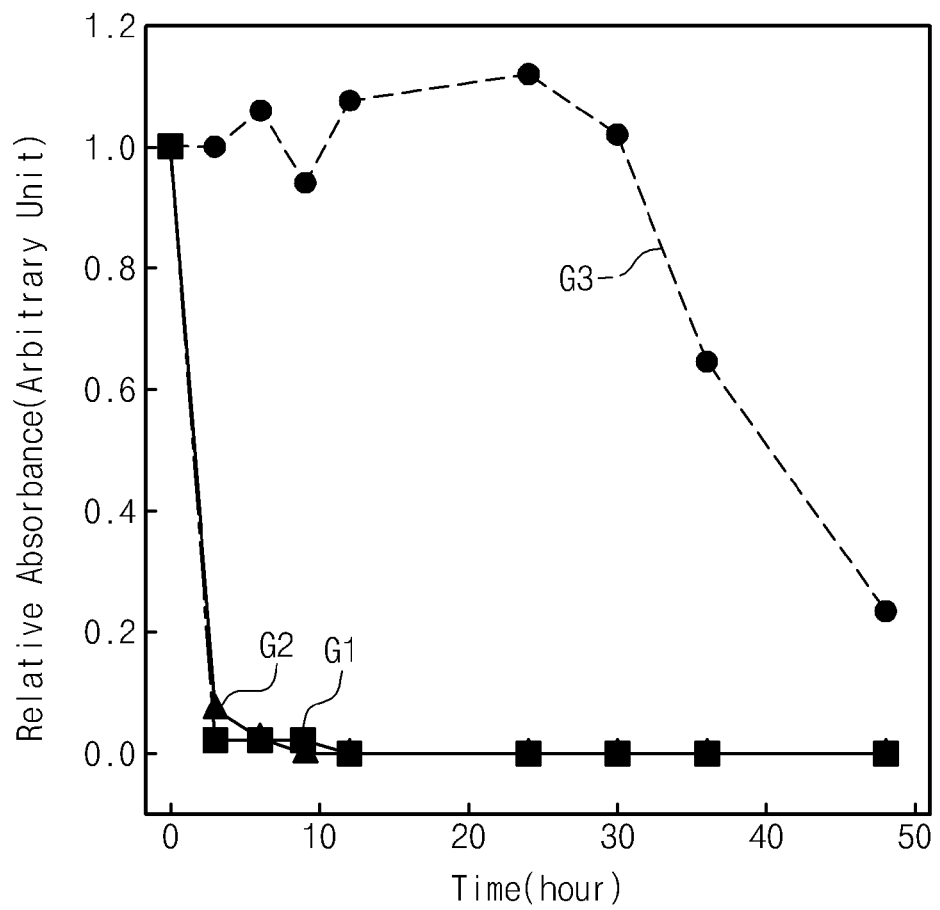
FIG. 3 is a graph showing the variation in the absorbance of quantum dots when an ultraviolet ray having a wavelength of about 362 nm is irradiated to a hybrid colloid solution at an energy of 2 mW/cm$^2$.

FIG. 3 is a graph showing the absorbance of quantum dots and the quantum dot-block copolymer hybrid when an ultraviolet ray was irradiated. In the graph, symbol G1 represents the absorbance of the quantum dots with oleic acid being surface-bonded thereto, symbol G2 represents the absorbance of quantum dots with alkyl thiol being surface-bonded thereto. Symbol G3 represents the absorbance of the quantum dot-block copolymer hybrid fabricated in Embodiment 2.

The ultraviolet ray was set to be irradiated with a wavelength of about 363 nm at an energy of about 2 mW/cm². Test samples collected according to time were centrifugally-separated such that precipitates were removed. Thereafter, the relative absorbance of the test samples was measured in a predetermined unit based on an exciton peak.

Referring to FIG. 3, as the duration during which ultraviolet ray was irradiated increased, colloid stability of quantum dots, the surfaces of which are bonded with oleic acid and alkyl thiol, was degraded. Accordingly, precipitates were formed, so that the absorbance of the quantum dots is deceased (see symbols G1 and G2). In contrast, the colloid solution of the quantum dot-block copolymer hybrid according to one exemplary embodiment of the present invention does not generate the precipitates and therefore maintained uniform absorbance even though a relatively long time had elapsed. Therefore, the quantum dot-block copolymer hybrid represents superior colloid stability.

Embodiment 4

Comparison in Dispersion Characteristic According to Grafting Density of Block Copolymer Quantum dots and block copolymer are mixed with each other at a ratio of (a) about 10 mg:about 1 mg, (b) about 10 mg:about 2 mg, or (c) about 10 mg:about 3 mg, thereby fabricating a quantum dot-block copolymer hybrid in the same method as that of Embodiments 1 and 2. In the present exemplary embodiment, the hybrid is dispersed in polystyrene matrix copolymer. In this case, the block copolymer has the number-average molecular weight of about 10 k, and the polystyrene matrix copolymer has the number-average molecular weight of about 20 k.

Figure 4A:
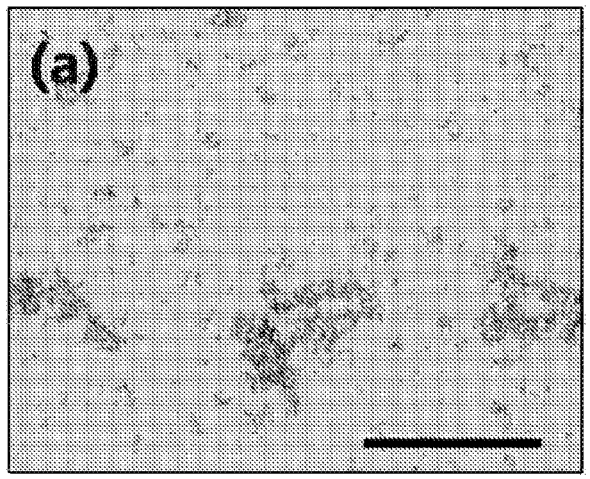
FIGS. 4A to 4C are transmission electron microscope ("TEM") photographs showing the dispersal, also referred to as dispersal density, of a quantum dot-block copolymer hybrid.
Figure 4B:
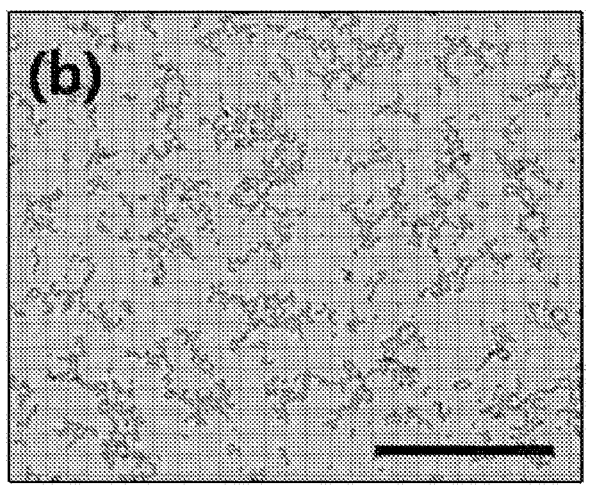
Figure 4C:
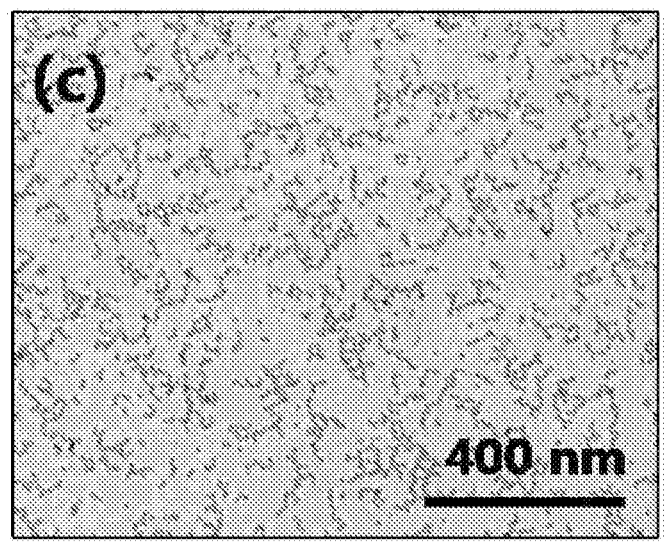
Figure 5A:
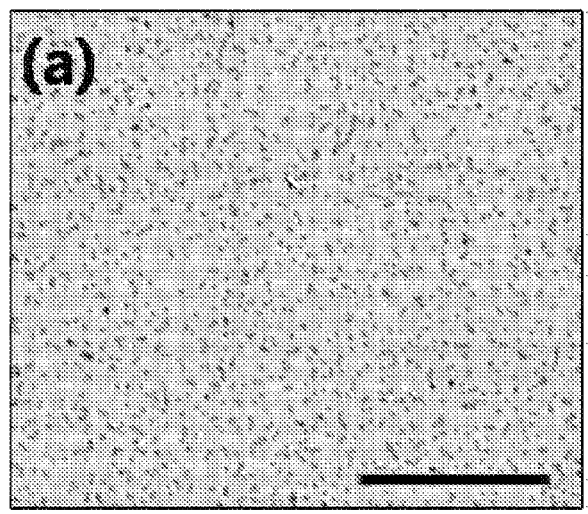
FIGS. 5A to 5D are TEM photographs showing the dispersal of the quantum dot-block copolymer hybrid.
Figure 5B:
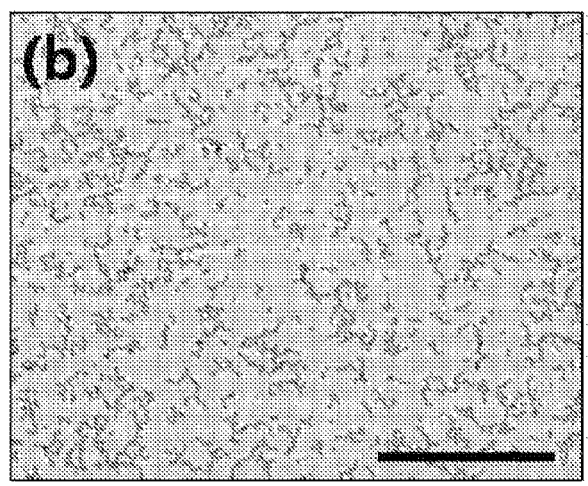
Figure 5C:
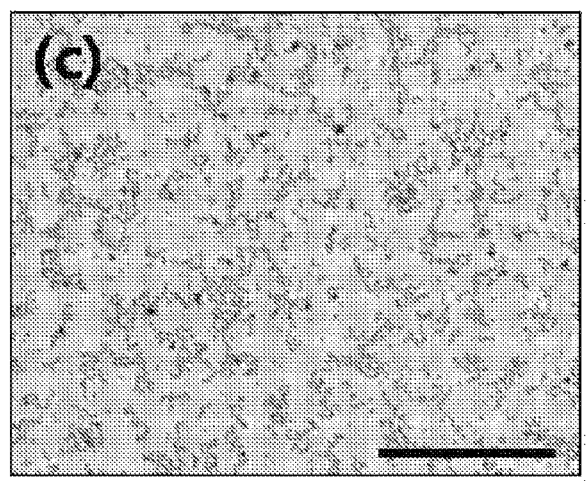
Figure 5D:
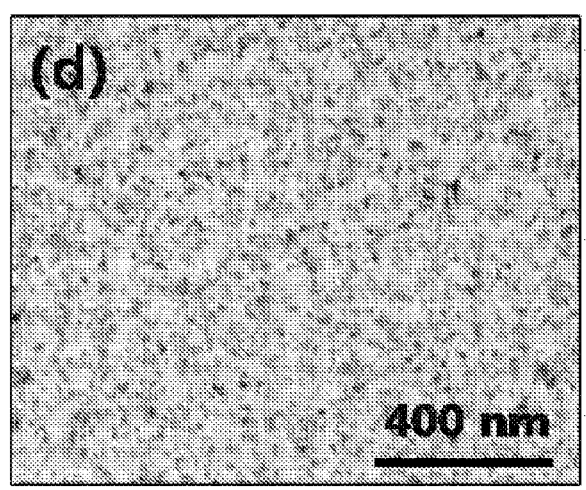

FIGS. 4A to 4C are transmission electron microscopy ("TEM") photographs showing the dispersal of the quantum dot-block copolymer hybrids according to the ratio of (a), (b), and (c). In this case, a scale with a length of about 400 nm is used.

As shown in FIGS. 4A to 4C, the dispersal of the quantum dot-block copolymer hybrid varies according to the ratio of quantum dots to block copolymer.

The poly-dispersal index ("PDI") of the quantum dots is expressed as Equation 1 based on the analysis of the TEM images. In Equation 1, the number-average number of quantum dots per aggregation is $M_n$, the weight-average number of quantum dots per aggregation is $M_w$, and the poly-dispersal index is expressed as PDI. The aggregation refers to a set of quantum dots when the quantum dots are adjacent to each other within a distance of about 2 nm. As the volume of the aggregation of the quantum dots is expanded, the quantum dots may vertically overlap with each other, so that the aggregation is not uniform. Accordingly, errors may be made in the quantitative analysis based on the TEM photography.

Variables "*i*" and "$N_i$" represent the number of quantum dots in an aggregation, and the number of aggregations having i quantum dots, respectively.

$$M_n = \frac{\sum_i iN_i}{\sum_i N_i}, \quad M_w = \frac{\sum_i i^2 N_i}{\sum_i iN_i}, \quad PDI = \frac{M_w}{M_n} \quad \text{<Equation 1>}$$

The variable $M_n$ represents the total quantum dots belonging to the total aggregations. As the value of $M_n$ approximates 1, the dispersion characteristic of the quantum dots become superior. The variable $M_w$ is an average value obtained by applying weights to the number of quantum dots belonging to aggregations. As the variable $M_w$ approximates 1, superior dispersion characteristic can be achieved. This numeric value is increased as the number of aggregations having a relatively large number of quantum dots is increased. Accordingly, the number of aggregations having a relatively large number of quantum dots can be indirectly recognized based on this numeric value.

Table 1 shows the PDI of the quantum dot-block copolymer hybrids shown in FIGS. 4A to 4C.

TABLE 1

| | quantum dot:block copolymer hybrid (mg) | | |
|---|---|---|---|
| | (a) 10:1 | (b) 10:2 | (c) 10:3 |
| $M_n$ | 5.26 | 18.8 | 12.5 |
| $M_w$ | 8.513 | 110 | 39.8 |
| PDI | 1.62 | 5.82 | 3.18 |

As shown in Table 1 and the TEM photographs, in the case of (a), most quantum dots are concentrated in about 5 large aggregations. In addition, since the aggregation is severe, data in the case of (a) may be disregarded.

However, as understood through Table 1, a predetermined amount of block copolymer must be used in order to ensure the dispersal of the quantum dots.

Embodiment 5

Comparison of Dispersion Characteristic According to Molecular Weights of Matrix Polymer with respect to that of Quantum-Block Copolymer Hybrid A quantum-block copolymer hybrid was manufactured using the same method as that of Embodiments 1 and 2. The hybrid was dispersed in polystyrene matrix polymer at about 10 mg:about 3 mg, which is the weight ratio of the hybrid to the polystyrene matrix polymer. The hybrid was dispersed in the polystyrene matrix polymer having an average molecular weight of (a) about 2 k, (b) about 20 k, (c) about 200 k, or (d) about 2000 k in the same manner.

FIGS. 5A to 5D are TEM photographs showing the dispersal of the quantum dot-block copolymer hybrid according to the average molecular weight of (a), (b), (c), or (d). In this case, a scale with a length of about 400 nm is printed together in the photographs.

As shown in FIGS. 5A to 5D, the dispersal of quantum dot-block copolymer hybrids varies depending on the average molecular weight of the matrix polymer.

Table 2 shows the PDI of the quantum dot-block copolymer hybrids shown in FIGS. 5A to 5D.

TABLE 2

| | Molecular weight (kg/mol) | | | |
|---|---|---|---|---|
| | (a) 2 | (b) 20 | (c) 200 | (d) 2000 |
| $M_n$ | 1.24 | 12.5 | 11.1 | → ∞ (the infinite) |
| $M_w$ | 2.16 | 39.8 | 67.5 | → ∞ (the infinite) |
| PDI | 1.74 | 3.18 | 6.07 | N/A |

As shown in table 2, as the molecular weight of the matrix polymer is increased, the aggregation degree of the quantum dots is gradually increased.

Embodiment 6

Comparison of Dispersion Characteristic According to Molecular Weights of Block Copolymer A quantum-block copolymer hybrid was manufactured in the same method as that of Embodiments 1 and 2. The quantum-block copolymer hybrid was dispersed in polystyrene matrix polymer at about 10 mg:about 3 mg which is the weight ratio of the hybrid to the polystyrene matrix polymer. In this case, the quantum-block copolymer hybrid is manufactured while changing the average molecular weight of block copolymer to (a) 5.7 k, (b) 7.8 k, or (c) 10 k.

Figure 6A:
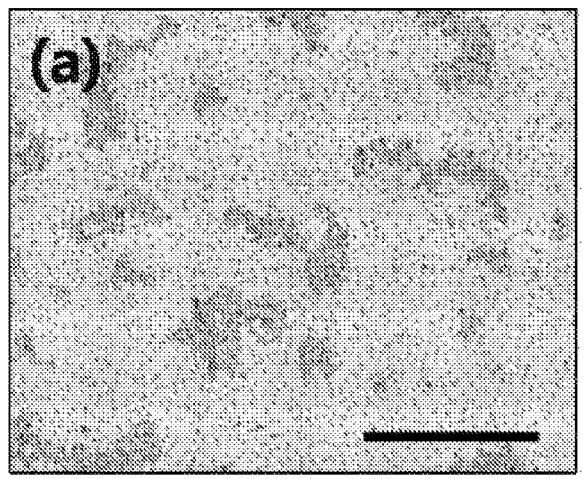
FIGS. 6A to 6C are TEM photographs showing the dispersal of the quantum dot-block copolymer hybrid.
Figure 6B:
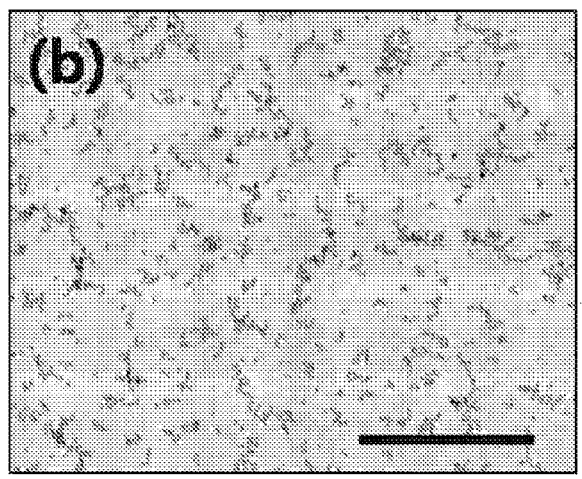
Figure 6C:
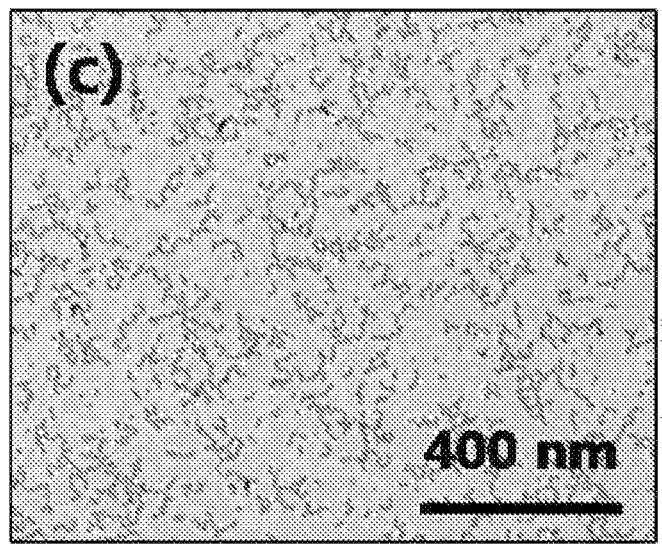

FIGS. 6A to 6C are TEM photographs showing the dispersal of the quantum dot-block copolymer hybrid according to the average molecular weight of (a), (b), or (c). In this case, a scale with a length of about 400 nm is printed together in the photographs.

As shown in FIGS. 6A to 6C, the dispersal of quantum dot-block copolymer hybrids varies depending on the average molecular weight of the block-copolymer.

Table 3 shows the PDI of the quantum dot-block copolymer hybrids shown in FIGS. 6A to 6C.

TABLE 3

| | Molecular weight (kg/mol) | | |
|---|---|---|---|
| | (a) 5.7 | (b) 7.8 | (c) 10 |
| $M_n$ | 1.80 | 8.2 | 12.5 |
| $M_w$ | 105 | 21.8 | 39.8 |
| PDI | 58.1 | 2.66 | 3.18 |

As shown in table 3, when the average molecular weight of the block copolymer constituting the hybrid with the quantum dot is changed, as the molecular weight of the block copolymer is increased, the dispersion characteristic can be improved.

As understood through Embodiments 3 to 5, the dispersion characteristic of quantum dot-block copolymer hybrid can be adjusted by changing the grafting density of the block copolymer, the average molecular weight of matrix polymer with respect to that of the quantum dot-block copolymer hybrid, and the average molecular weight of the block copolymer constituting the quantum dot-block copolymer hybrid together with the quantum dot.

Embodiment 7

Figure 7A:
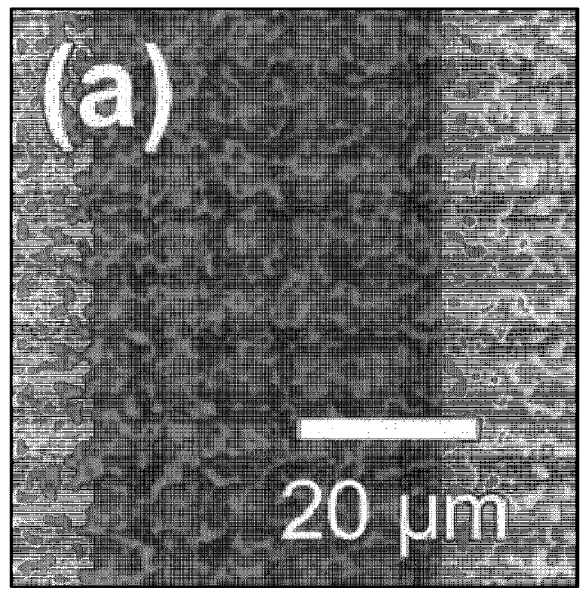
FIGS. 7A to 7C show (a) an optical microscope photograph of an upper portion of a thin film, (b) a fluorescence microscope photograph of the upper portion of the thin film, and (c) a scanning electron microscope photograph of the profile of the thin film when the thin film is formed by dispersing conventional quantum dots into polymer.
Figure 7B:
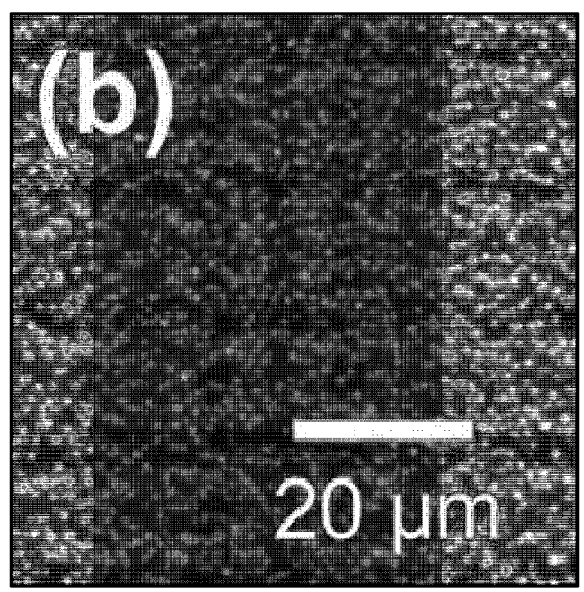
Figure 7C:
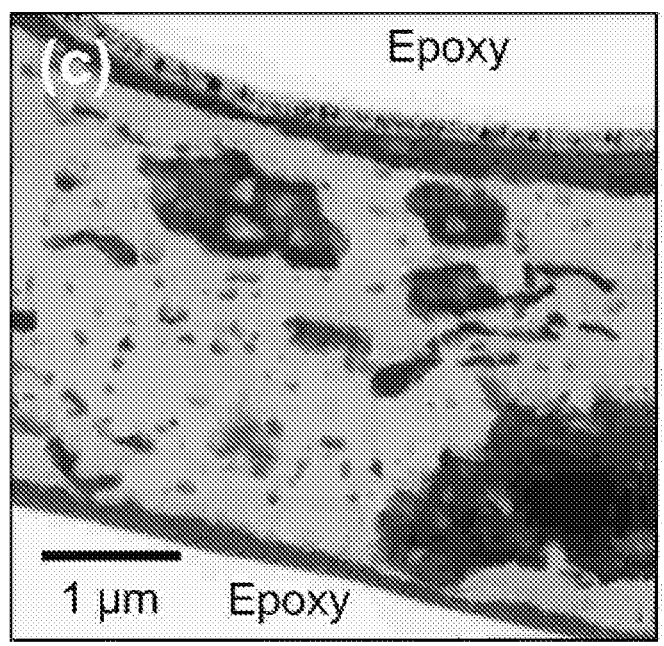

Comparison of Conventional Mixture of Quantum Dot-Polymer and Thin Film of Block Copolymer According to One embodiment of Present Invention FIGS. 7A to 7C shows (a) an optical microscope photograph of an upper portion of a thin film, (b) a fluorescence microscope photograph of the upper portion of the thin film, and (c) a scanning electron microscope ("SEM") photograph of the profile of the thin film when the thin film is formed by mixing quantum dots, which is not subject to hybridization, with polymer matrix.

Figure 8A:
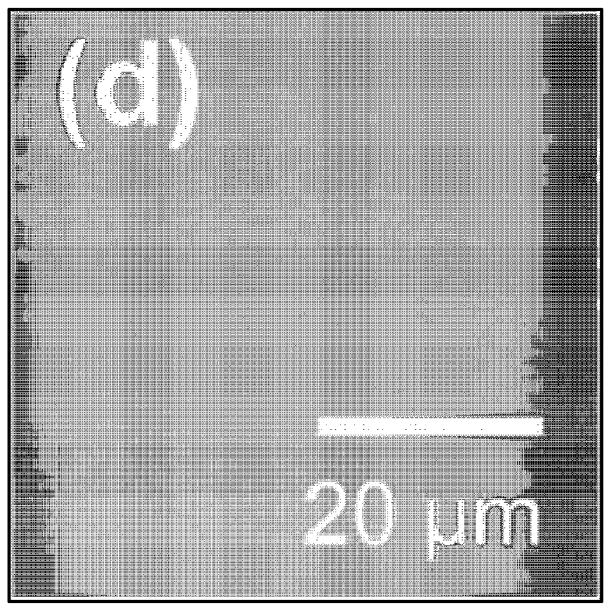
FIGS. 8A to 8C show (c) an optical microscope photograph of an upper portion of a thin film, (d) a fluorescence microscope photograph of the upper portion of the thin film, and (f) a scanning electron microscope photograph of the profile of the thin film when the thin film is formed by dispersing the quantum dot-block copolymer hybrid according to one embodiment of the present invention in the matrix polymer.
Figure 8B:
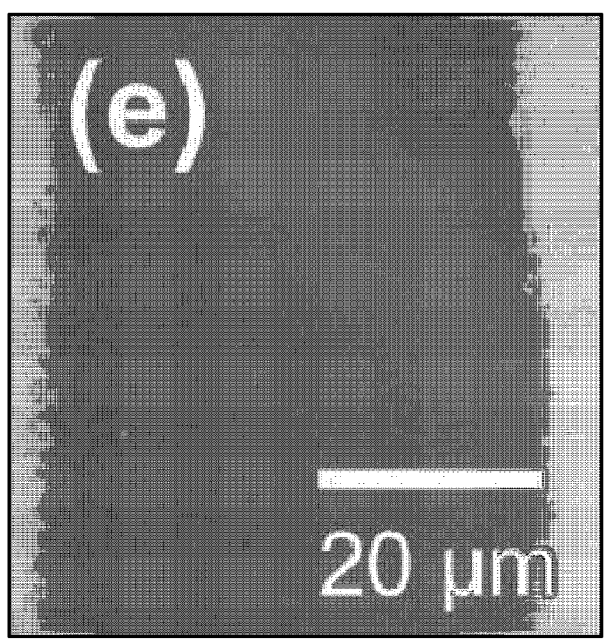
Figure 8C:
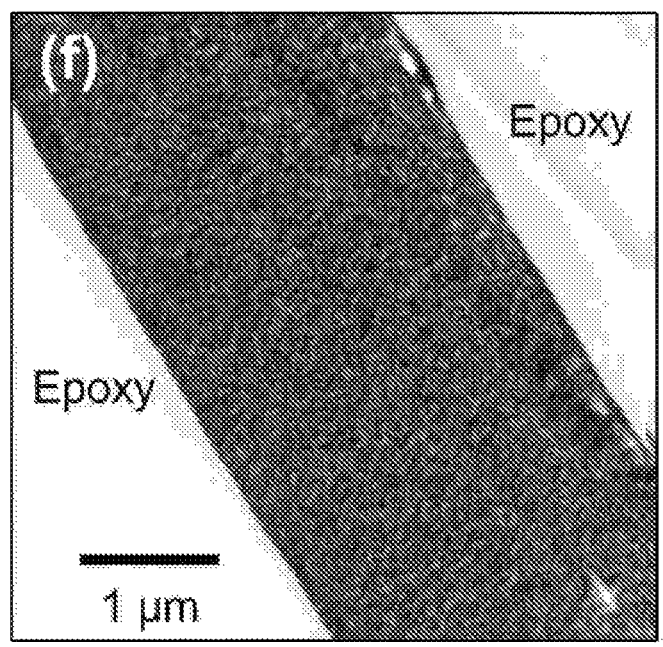

FIGS. 8A to 8C shows (c) an optical microscope photograph of an upper portion of a thin film, (d) a fluorescence microscope photograph of the upper portion of the thin film, and (f) a scanning electron microscope photograph of the profile of the thin film when the thin film is formed by dispersing the quantum dot-block copolymer hybrid according to one exemplary embodiment of the present invention in the matrix polymer.

Referring to FIGS. 7A to 7C, and FIGS. 8A to 8C, the thin film including the quantum dot-block copolymer hybrid according to one exemplary embodiment of the present invention can represent high dispersal.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A light emitting device comprising:
   a substrate;
   a quantum dot-block copolymer hybrid layer disposed on the substrate; and
   a light emitting diode interposed between the substrate and at least a portion of the quantum dot-block copolymer hybrid layer,
   wherein the quantum dot-block copolymer hybrid layer comprises:
   a quantum dot; and
   a block copolymer which surrounds the quantum dot,
   wherein the block copolymer has a functional group comprising sulfur (S) and forms a chemical bond with the quantum dot.

2. The light emitting device of claim 1, wherein the functional group comprises one selected from the group consisting of alkylthiol, alkyl xanthate, and dialkylthiocarbamate, in which a carbon number of an alkyl group is in a range of about 1 to about 22 carbon atoms.

3. The light emitting device of claim 1, wherein the quantum dot comprises at least one of group II-VI elements, group III-V elements, group IV elements, and group IV-VI elements.

4. The light emitting device of claim 3, wherein the quantum dot has one of a single core structure, a core-single shell structure, and a core-multi-shell structure.

5. The light emitting device of claim 3, wherein the group II element comprises at least one selected from the group consisting of zinc (Zn), cadmium (Cd), and mercury (Hg), the group III element comprises at least one selected from the group consisting of aluminum (Al), gallium (Ga), and indium (In), the group IV element comprises at least one selected from the group consisting of silicon (Si), germanium (Ge), tin (Sn), and lead (Pb), the group V element comprises at least one selected from the group consisting of nitrogen (N), phosphorus (P), and arsenic (As), and the group VI element comprises at least one selected from the group consisting of sulfur (S), selenium (Se), and tellurium (Te).

6. The light emitting device of claim 1, wherein the light emitting diode emits a light, and the quantum dot absorbs the light and emits a visible ray corresponding to an energy band gap between an excited state and a ground state of the quantum dot.

* * * * *